United States Patent
Garg

(10) Patent No.: US 7,558,567 B2
(45) Date of Patent: Jul. 7, 2009

(54) BSS-SWITCH MODULE FOR WIRELESS DEVICES

(75) Inventor: Parag Garg, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 409 days.

(21) Appl. No.: 10/566,801

(22) PCT Filed: Jul. 31, 2004

(86) PCT No.: PCT/IB2004/002439

§ 371 (c)(1),
(2), (4) Date: Jan. 30, 2006

(87) PCT Pub. No.: WO2005/013560

PCT Pub. Date: Feb. 10, 2005

(65) Prior Publication Data

US 2007/0053362 A1    Mar. 8, 2007

Related U.S. Application Data

(60) Provisional application No. 60/492,199, filed on Aug. 1, 2003.

(51) Int. Cl.
*H04Q 7/20* (2006.01)
(52) U.S. Cl. ............... 455/424; 455/11.1; 455/436; 455/437; 455/438; 455/439; 455/440; 455/441; 455/443
(58) Field of Classification Search ......... 455/424, 455/565.5, 561, 11.1, 436–441, 443; 370/395.1
See application file for complete search history.

(56) References Cited

U.S. PATENT DOCUMENTS 6,360,264 B1 *   3/2002   Rom .................. 709/227
2002/0085719 A1    7/2002   Crosbie

FOREIGN PATENT DOCUMENTS

EP    0 589 552         3/1994
EP      851633 A2 *    7/1998

* cited by examiner

*Primary Examiner*—Lester Kincaid
*Assistant Examiner*—Charles Shedrick

(57) ABSTRACT

An access point (AP) (120a) manages and coordinates the switching of mobile devices (110) to other access points (120b, c, d). The access point (120a) monitors the quality of its communications link with the mobile device (110). When the access point (120a) determines that the quality is degrading, or when the access point (120a) determines that its traffic is excessive, or when another switch-triggering event (202) occurs, the access point (120a) sends a transfer-request to other access points (120b, c, d) in its vicinity. If another access point can accept the mobile device (110), it notifies the requesting access point (120a) that it is available. The requesting access point (120a) selects from among the available access points (120b, c, d), and notifies the mobile device (110) to switch to the selected access point. The notification to the mobile device (110) includes the appropriate attributes of the selected access point, so that the mobile device (110) can effect the switch to this selected access point with minimum overhead or delay. The requesting access point (120a) maintains a message buffer during this transfer process, so that any data lost during the transfer can be easily recovered.

18 Claims, 2 Drawing Sheets

BSS-SWITCH MODULE FOR WIRELESS DEVICES

CROSS REFERENCE TO RELATED APPLICATION

This application claims the benefit of U.S. provisional application Ser. No. 60/492,199 filed Aug. 1, 2003, which is incorporated herein whole by reference.

BACKGROUND OF THE INVENTION

This invention relates to the field of communications, and in particular to a method and system for managing a wireless network wherein wireless devices are free to roam among multiple Basic Service Sets (BSSs) in an Extended Service Set (ESS).

Mobile devices, such as laptop computers, personal data assistants (PDAs), headsets, voice over IP (VOIP) phones, and so on, are becoming increasingly popular, and standards and protocols, such as IEEE 802.11 and Bluetooth have been established to facilitate the networking of such devices to form wireless local area networks (WLANs).

Conventionally, the mobile device establishes a connection via an access point (AP) on the WLAN and monitors the quality of the connection. When the quality of the connection becomes marginal, such as occurs when the mobile device travels away from the access point, the mobile device searches for another access point in the network having potentially better quality. Upon detection of another access point with better quality, the mobile device establishes communication with this other access point and cancels the connection with the prior access point. The other access point may be in the same sub-network, or Basic Service Set (BSS), as the original access point, or in a different sub-network that is coupled to the original sub-network, forming an Extended Service Set (ESS).

The continued monitoring of signal quality, and searching for alternative access points by the mobile device consumes power that could otherwise be used for the communication of information over the network. U.S. patent application "METHOD AND SYSTEM FOR ENABLING CENTRALIZED CONTROL OF WIRELESS LOCAL AREA NETWORKS", publication number 2002/0085719, filed 22 Oct. 2001 for David B. Crosbie, incorporated by reference herein, discloses the use of a roaming server that monitors the quality of the links between access points and wireless devices, and effects a substantially seamless transfer of the wireless devices to alternative access points as required. The transfer of a wireless device to an alternative access point may also be triggered based on the congestion of particular links, the location of the wireless device, or an explicit request from either the access point or the mobile device. The seamless transfer is achieved by "address-spoofing". The roaming server transfers the "session data" from the original access point to the new access point, so that the new access point adopts the address of the original access point, along with other communications parameters, such as the frequency offset, hop sequence, encryption key, and so on. To assure continuous communication, the clocks are synchronized by having the wireless device assume a 'master' role with the original access point, then assume a 'slave' role with the new access point. Although this scheme provides a seamless transfer of the wireless device from the original access point to the new access point, this session-data spoofing and master-then-slave clock synchronization is contrary to the underlying autonomous principles of conventional networking protocols.

SUMMARY OF THE INVENTION

It is an object of this invention to provide a management method and system for a wireless network that minimizes the tasks that need to be performed by the wireless device. It is a further object of this invention to provide a network management method and system that is substantially consistent with existing standards, such as IEEE 802.11 a/b/g.

These objects, and other, are achieved by a switching scheme wherein an access point (AP) manages and coordinates the switching of mobile devices to other access points. The access point monitors the quality of its communications link with the mobile device. When the access point determines that the quality is degrading, or when the access point determines that its traffic is excessive, or when another switch-triggering event occurs, the access point sends a transfer-request to other access points in its vicinity. If another access point can accept the mobile device, it notifies the requesting access point that it is available. The requesting access point selects from among the available access points, and notifies the mobile device to switch to the selected access point. The notification to the mobile device includes the appropriate attributes of the selected access point, so that the mobile device can effect the switch to this selected access point with minimum overhead or delay. The requesting access point maintains a message buffer during this transfer process, so that any data lost during the transfer can be easily recovered.

DETAILED DESCRIPTION

Figure 1:
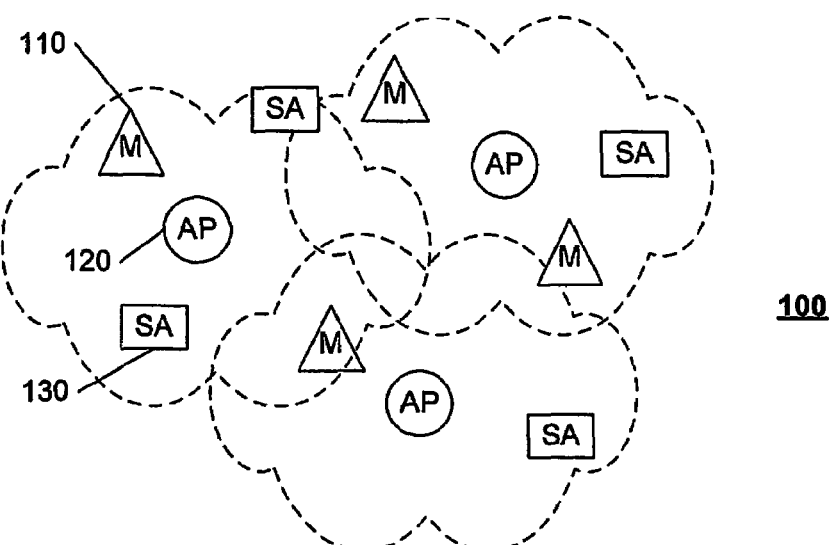
FIG. 1 illustrates an example block diagram of a wireless network in accordance with this invention.

Throughout the drawings, the same reference numeral refers to the same element, or an element that performs substantially the same function.

In the following description, the IEEE 802.11 a/b/g wireless device communications protocol is used as the paradigm of a wireless communications system, although one of ordinary skill in the art will recognize that the principles of this invention are not limited to the particular examples provided.

FIG. 1 illustrates an example block diagram of a wireless network 100 in accordance with this invention. The example network 100 includes three access points AP 120, with which mobile devices M 110 communicate to transfer data across the network, and/or to other networks. Also included in the example network 100 are optional switch-assist devices SA 130, whose function is explained below. The mobile devices M communicate with the access points AP via wireless communications, whereas the AP and SA devices may communicate with each other by wireless or wired communications, depending upon the particular network environment.

Each mobile device M is associated with one access point, and sends and receives each of its messages via this access point. When a mobile device M first encounters the network 100, it sends an access request to a detected access point AP.

If the access point AP can accept this mobile device M, the access point AP provides the mobile device a "description set" that identifies the communications and protocol parameters required for joining the network via this access point AP. An access point AP may support a plurality of mobile devices M contemporaneously.

In accordance with this invention, an access point AP monitors the quality of the, communication channel of each of its associated mobile devices M, and attempts to locate a more suitable access point AP for a mobile device M when the quality of the channel deteriorates. If a more suitable AP is found, the original AP obtains the required description set for communicating with the new access point, and forwards it to the mobile device M with the command to switch to the new access point. In a preferred embodiment of this invention, this new description set conforms to the description set that would have been provided to the mobile device M after a conventional access negotiation between the mobile device and the new access point, thereby maintaining substantial conformity with the conventional protocol specification. With this new description set, the mobile device M is able to switch to the new access point without incurring the overhead associated with the conventional process of searching for and negotiating access with the new access point.

Figure 2:
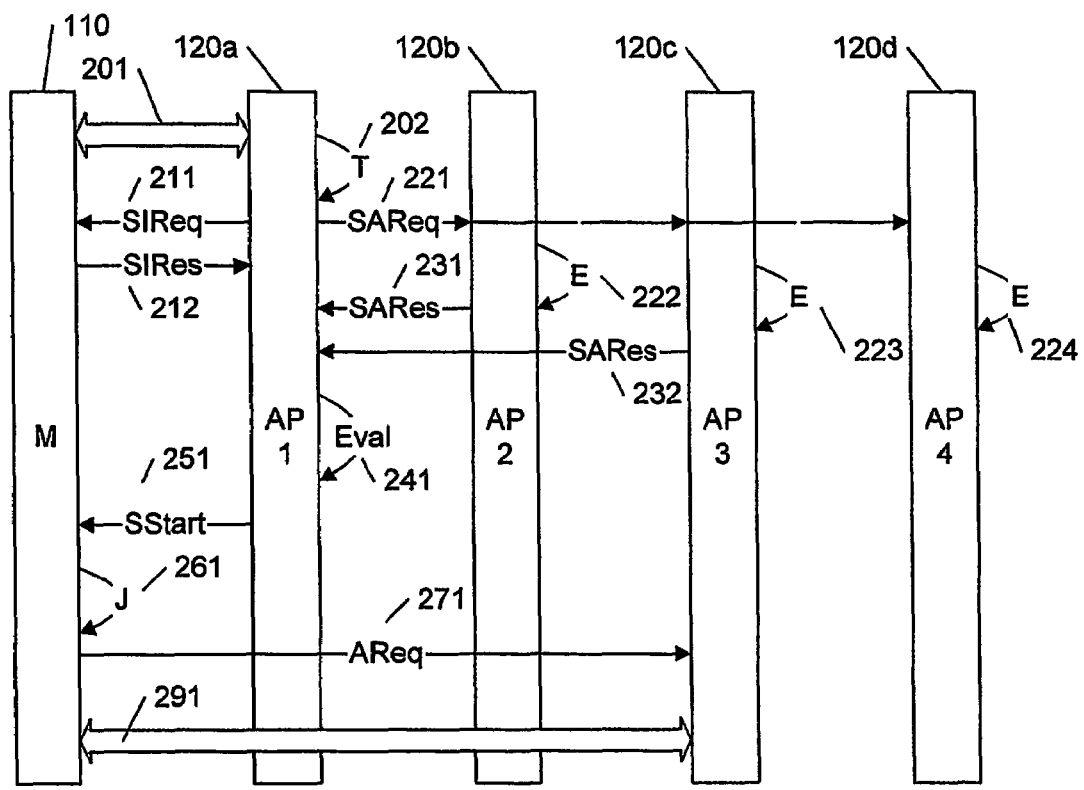
FIG. 2 illustrates an example flow diagram of a wireless network switching process in accordance with this invention.

FIG. 2 illustrates an example flow diagram of a wireless network switching process in accordance with this invention. The mobile device M 110 communicates messages 201 with its associated access point AP 120a. The access point AP 120a continuously assesses the quality of the communications link with the mobile device M 110. At some point, a "trigger event" T 202 occurs that causes the access point AP 120a to initiate a search for a more suitable access point for servicing the mobile device M 110. This trigger event T 202 may be a decrease in signal strength from the mobile device M 110, a decrease in throughput capability for the device M 110 due to increased traffic load from other devices through this access point AP 120a, a reported movement of the mobile device M 110 away from the access point AP 120a, and so on. Any of a number of techniques may be used to assess the quality of the communications link to and from the mobile device M. For example, a measure of the received signal strength, such as the common RSSI signal, and Signal quality signal, provides an assessment of the quality of communications from the mobile device M, and the number of requested retransmissions from the mobile device M provides an assessment of the quality of communications to the mobile device M. In a preferred embodiment of this invention, the mobile device M is configured to periodically send a message to the access point 120a during periods of inactivity, to facilitate continuous quality assessments and/or location determinations.

The optional switch-assist device SA 130 in FIG. 1 is configured to facilitate a determination of this trigger event T 202. In a preferred embodiment of this invention, the switch-assist device SA monitors communications from mobile devices M, and reports measures related to the these communications to one or more of the access points AP 120. From these reports, and knowledge of the location of each switch-assist device SA, the access point 120a of FIG. 2 is able to estimate the approximate location of the mobile device M 110, and thereby determine the direction of movement, if any, of the mobile device M. In this way, a detected movement of the mobile device M toward the periphery of the range of the access point 120a will trigger an event T 202.

Upon the occurrence of a trigger event T 202, the access point AP 120a initiates a search for a more suitable access point for servicing the mobile device M. Access point AP 120a send a "switch-assessment" request SAReq 221 to each of the other access points in the network. Optionally, if the approximate location and/or traveling direction of the mobile device M is known, or the identification of immediately adjacent access points are known, the switch-assessment request SAReq 221 may be sent to only a select few of the other access points in the network. In a preferred embodiment of this invention, the switch-assessment request SAReq 221 includes the communications parameters and/or traffic requirements associated with the mobile device M, so that each of the other access points can provide an assessment of its suitability for specifically servicing the device M.

Each access point 120b-d that receives the request 221 evaluates the request, illustrated in FIG. 2 as E 222, 223, 224, respectively. Each access point 120b-c that can accommodate the mobile device M responds with a switch-assessment response 231, 232. Optionally, access points 120d that cannot accommodate the mobile device M respond with an explicit negative response.

The original access point 120a evaluates the responses 231, 232 to determine the most suitable access point 120b, 120c for servicing the mobile device M, at 241 in FIG. 2. This evaluation is preferably based on the compatibility of the mobile device M with each of the access points 120b, 120c, the available capacity of access points 120b, 120c in view of the traffic requirements of the mobile device M, and other factors. In a preferred embodiment of this invention, the user of the mobile device M, or the provider of the access points AP, are provided the option of explicitly declaring factors that affect the determination of a suitable pairing of a mobile device to a particular access point. For example, a user or network administrator may provide an access classification for each access point relative to each mobile device, the classification being, for example, preferred, acceptable, forbidden, and so on. In a commercial environment, this classification may be based on a subscription level, a quality-of-service parameter, and so on.

Also in a preferred embodiment of this invention, the evaluation of the responses 231, 232 may also include consideration of the path of motion of the mobile device M, to minimize subsequent AP-switches. For example, if the predicted path of the mobile device M crosses the periphery of the field of a first AP switch, then into the core of the field of a second AP switch, and if the second AP switch is currently suitable for accepting the mobile device M, the original access point preferably selects the second AP switch, even if the first AP switch might be considered more favorable for other factors. In this manner, an interim switch to the first AP switch is avoided. In like manner, the original access point AP 120a may delay switching until a particular access point in the predicted path of the mobile device M is able to support the mobile device M.

Optionally, the access point AP 120a also notifies the mobile device M of a potential switch of access points, via a "switch-imminent" request SIReq 211. The mobile device M acknowledges receipt of this request 211 with a switch-imminent response SIRes 212. In this optional configuration, the access point AP 120a may be configured to postpone some or all of the above described process of searching and selecting an alternative access point for the mobile device M until the response SIRes 212 is received. The mobile device M may be configured to refuse to switch to a new access point for security purposes, or it may be configured to prompt the user for approval of a switch of access point, or it may be configured to only allow a switch upon completion of each message session, and so on.

Having selected the most suitable access point for servicing the mobile device M, which in the example of FIG. 2 is access point 120c, the original access point 120a directs the mobile device M to switch to the new access point 120c via a switch-start command 251. In a preferred embodiment of this invention, the aforementioned switch-assessment responses SARes 231, 232 include the description set required to establish a communications channel with each access point AP 120b, 120c. Optionally, this information can be requested from the selected access point AP 120c after the original access point 120a completes the evaluation process 241. This description set is communicated to the mobile device M as part of the switch-start command 251. In response to this command 251, the mobile device M configures itself according to the aforementioned description set to join the network via the new access point 120c, at 261, and sends a message to associate itself to the new access point 120c, at 271. In the IEEE 802.11 protocol, this association is established via a reassociation request, which, if Inter Access Point protocol 802.11f is implement, also initiates a set of authentication messages between the original access point 120a and the new access point 120c. Thereafter, messages 291 are communicated between the mobile device M and the network via the new access point 120c.

In a preferred embodiment of this invention, the original access point AC 120a is configured to store data communications to and from the mobile device M during the transition of the mobile device M to the new access point AP 120c, to facilitate recovery in the event that the transition is unsuccessful or problematic.

Figure 3:
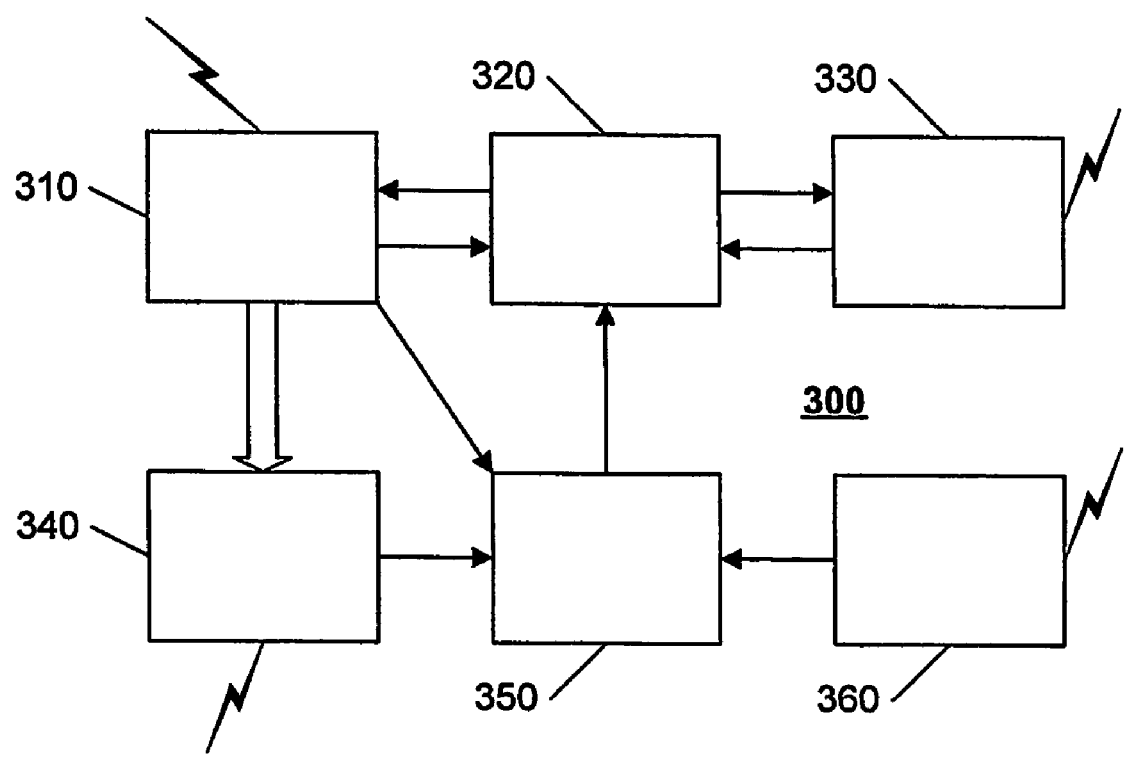
FIG. 3 illustrates an example block diagram of an access point device in accordance with this invention.

FIG. 3 illustrates an example block diagram of an access point device 120 in accordance with this invention. The access point device 120 includes a transceiver 310 for wireless communication with mobile devices, a transceiver 330 for wired or wireless communication with other access points, and, optionally, a transceiver 360 for wired or wireless communication with switch-assist devices. During routine operation, the access point device 120 communicates messages between the mobile device and the network via a data handler 340.

The device 120 includes a trigger control module 350 that is configured to initiate a search for an alternative access point for servicing a mobile device. The module 350 receives signal quality measures and other measures from the transceiver 310, message error rate statistics, traffic flow statistics, and other measures from the data handler 340, and, optionally, signal quality measures and other measures from the transceiver 360. Based on this received information, the trigger controller 350 determines whether to initiate an access-point-switch procedure, as discussed above.

The trigger control module 350 communicates the initiation signal to a switch control module 320. The switch control module 320 sends the aforementioned switch-assessment request to one or more other access points, and receives corresponding switch-assessment replies from one or more of the other access points, via the transceiver 330. Optionally, the switch control module 320 also communicates the aforementioned switch-imminent request and response signals to and from the mobile device via the transceiver 310. Upon receipt of the switch-assessment replies from the other access points, the switch control module 320 determines the most suitable new access point, if any, for the mobile device, as discussed above. If a more suitable access point is determined, the switch control module 320 issues a switch command to the mobile device to effect the new association of the mobile device to the selected access point. As noted above, in a preferred embodiment of this invention, the command to switch access points includes all of the information required to effect this new association, thereby freeing the mobile device of the conventional overhead of searching for and negotiating with the other access devices as it travels through the network, thereby minimizing the disruption of traffic flow.

The foregoing merely illustrates the principles of the invention. It will thus be appreciated that those skilled in the art will be able to devise various arrangements which, although not explicitly described or shown herein, embody the principles of the invention and are thus within its spirit and scope. For example, separate transceivers 310, 330, and 360 are illustrated to provide communications with the mobile devices, other access points, and switch-assist modules, respectively, although fewer transceivers could be employed if the mobile device, access points, and/or switch-assist modules share a common communication technology. These and other system configuration and optimization features will be evident to one of ordinary skill in the art in view of this disclosure, and are included within the scope of the following claims.

What is claimed is:

1. A method of network management in a network comprising a plurality of access points, comprising:

monitoring a communication channel between a mobile device and a first access point in a wireless local area network (WLAN) by the first access point to determine whether a trigger event occurs; and if the trigger event is determined to have occurred:

sending a switch-assessment request from the first access point to one or more other access points of the plurality of access points;

receiving a switch-assessment response from at least one of the one or more other access points;

selecting a select access point from the at least one of the one or more other access points based on the switch-assessment response;

sending a switch-command from the first access point to the mobile device to establish a communication channel between the mobile device and the select access point;

maintaining a message buffer for the mobile device by the first access point until the switch of the mobile device from the first access point to the select access point is complete; and defining a plurality of access classifications associated with the mobile device and at least one of the one or more access points of the plurality of access points and selecting the select access point based at least in part on one or more access classifications, wherein the trigger event is determined based in part on a determination of a direction of movement of the mobile device by the first access point by estimating a location of the mobile device using one or more reports from at least one switch-assist device that monitors communications from the mobile device, the location of the at least one switch-assist device being known to the first access point.

2. The method of claim 1, wherein the trigger event is based at least in part on at least one of: a signal strength of communications from the mobile device, an error rate associated with communications to the mobile device, and traffic through the first access point.

3. The method of claim 1, further including receiving other information at the first access point regarding communications from the mobile device and determining the direction of movement based at least in part on this other information.

4. The method of claim 1, further including providing configuration information to the mobile device to facilitate establishing the communication channel between the mobile device and the select access point.

5. The method of claim 4, further including receiving the configuration information from the select access point.

6. The method of claim 1, further including sending periodic messages from the mobile device to the first access point to facilitate the monitoring of the communications channel between the mobile device and the first access point.

7. The method of claim 1, wherein sending the switch-assessment request includes sending parameters associated with the mobile device to the one or more other access points.

8. The method of claim 7, wherein selecting the select access point is based at least in part on at least one of: a compatibility between the mobile device and the select access point, traffic at the select access point traffic of the mobile device, and a predicted path of the mobile device.

9. The method of claim 1, wherein the access classifications include preferred, acceptable, forbidden, subscription level, and quality-of-service parameters.

10. An access point device comprising:
a trigger control module that is configured to determine a trigger event and initiate a transfer of a mobile device to a selected access point device of other access point devices in wireless local area network (WLAN) when the trigger event occurs,
a first transceiver that is configured to provide a communication channel with said trigger control module; and
a switch control module that is configured to effect the transfer of the mobile device to the selected access point device of other access point devices,
wherein the switch control module is configured to: send a switch-assessment request to one or more other access point devices, receive a switch-assessment response from at least one of the one or more other access point devices, select a select access point device from the at least one of the one or more other access point devices based on the switch-assessment responses, send a switch-command to the mobile device via the first transceiver to establish a communication channel between the mobile device and the select access point device, and for determining a classification of the mobile device and at least one of the one or more other access point devices relative to the mobile device from a plurality of access classifications and for selecting the select access point device based at least in part on one or more access classifications,
wherein the trigger event is determined based in part on a determination of a direction of movement of the mobile device by the trigger control module by estimating a location of the mobile device using one or more reports from at least one switch-assist device in the WLAN that monitors communications from the mobile device, the location of the at least one switch-assist device being known to the access point device.

11. The device of claim 10, wherein the trigger control module is configured to initiate the transfer based at least in part on at least one of: a signal strength of communications from the mobile device, an error rate associated with communications to the mobile device and traffic through the first access point device.

12. The device of claim 10, further including a second transceiver that is configured to receive other information regarding communications from the mobile device, wherein determining the direction of movement is based at least in part on this other information; and
a message buffer associated with the access point device for buffering data for the mobile device until the switch control module confirms the transfer to the selected access point device is complete.

13. The device of claim 10, wherein the switch control module is further configured to provide configuration information to the mobile device to facilitate establishing the communication channel between the mobile device and the select access point device.

14. The device of claim 13, wherein the switch control module is further configured to receive the configuration information from the select access point device.

15. The device of claim 10, wherein the switch-assessment request includes parameters associated with the mobile device.

16. The device of claim 15, wherein the switch control module is configured to select the select access point device based at least in part on at least one of: a compatibility between the mobile device and the select access point device, and traffic at the select access point device traffic of the mobile device.

17. The device of claim 10, wherein the switch control module is further configured to select the select access point device based at least in part on an access classification associated with the mobile device and at least one of the one or more other access point devices.

18. The device of claim 10, wherein the switch control module is further configured to select the select access point device based at least in part on: a geographic location of the select access point device and a predicted travel path of the mobile device.

* * * * *